Jan. 2, 1923.

M. GRALENSKI.
RESILIENT WHEEL.
FILED APR. 29, 1921.

INVENTOR.
Michal Gralenski
BY
ATTORNEY

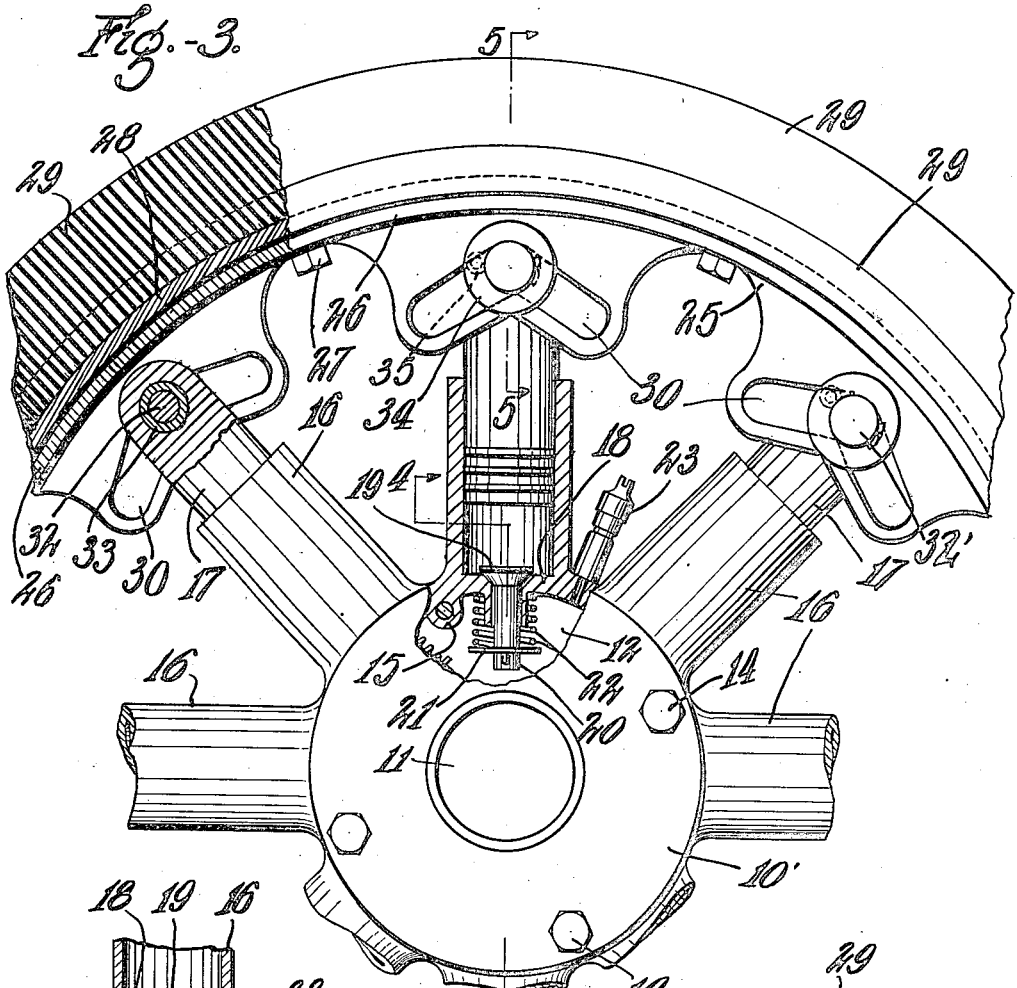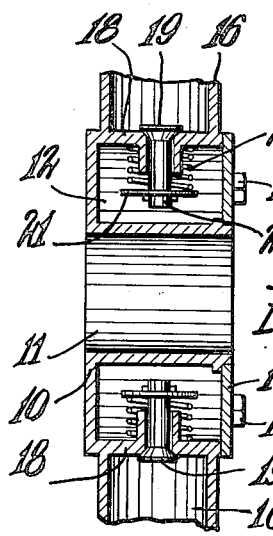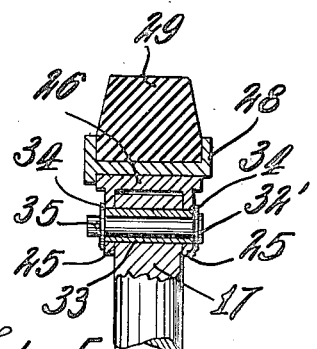

Patented Jan. 2, 1923.

1,440,915

UNITED STATES PATENT OFFICE.

MICHAL GRALENSKI, OF AMHERST, MASSACHUSETTS.

RESILIENT WHEEL.

Application filed April 29, 1921. Serial No. 465,354.

*To all whom it may concern:*

Be it known that I, MICHAL GRALENSKI, citizen of Poland, residing at Amherst, in the county of Hampshire and State of Massachusetts, have invented certain new and useful Improvements in Resilient Wheels, of which the following is a specification.

This invention relates to resilient vehicle wheels, having more particular reference to a wheel having telescopic spokes extended by pneumatic pressure.

This invention has for an object to provide an improved and novel construction of resilient wheel of this type in which provision is made in a simple manner for accommodating the relative displacement of rim and axle while permitting the requisite torque to be applied to the wheel.

For further comprehension of the invention, and of the objects and advantages thereof, reference will be had to the following description and accompanying drawings, and to the appended claims in which the various novel features of the invention are more particularly set forth.

Fig. 1 of the drawings is a face view of a resilient wheel constructed according to the invention.

Fig. 3 is an enlarged fragmentary face view with certain exterior parts broken away.

Fig. 4 is a partial transverse section on the line 4—4 of Fig. 3.

Fig. 5 is a partial transverse section on the line 5—5 of Fig. 3.

Figure 1:
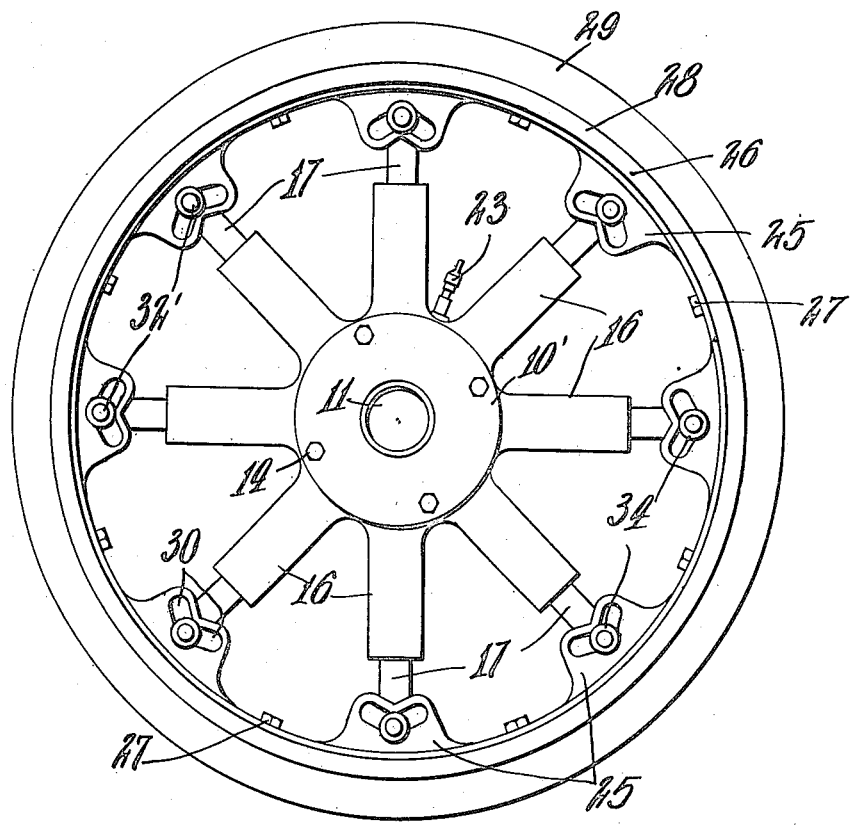
Figure 2:
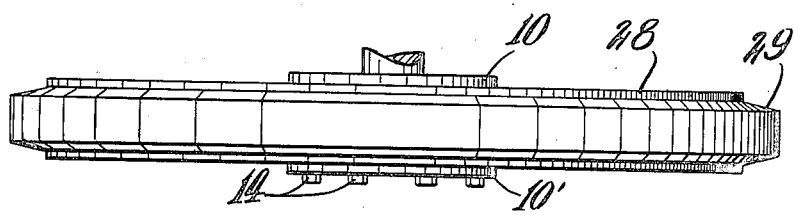
Fig. 2 is an edge view thereof.

In constructing my improved resilient wheel I provide a hub 10 presenting the usual axle opening 11 and which is of hollow construction to present an annular air chamber 12, one face of the hub being in the form of a plate 10′ held in place by screws 14, engaging in tapped borings in suitable bosses such as 15 on the hub body, it being understood that proper packing elements will be employed to make an air tight joint between the plate 10′ and the hub body.

Formed integral with the hub 10 are a series of cylindrical spoke elements 16, in which are slidably engaged the plungers 17 which complete the spokes, which are thus of telescopic construction. Formed on the inner ends of the cylindrical elements 16 are heads such as 18 forming seats for one-way valves 19 which are adapted to admit air into the cylinders 16 but prevent escape thereof.

These valves 19 are here shown as formed with integral stems 20 which extend radially into the annular chamber 12 and have washers 21 upon their inner ends. Coiled expansion springs 22, which surround the stems 20 and bear between the washers 21 and the heads 18, serve to keep the valves 19 yieldingly in closed position. Air may be pumped into the annular chamber 12 through an opening controlled by a valve 23 of ordinary type.

The outer ends of the plungers 17 project between flange elements 25 formed on opposite sides of and projecting inwardly from a felly 26 upon which may be secured, as by bolts 27, a rim 28 carrying a tire 29 which may be of solid rubber as here shown, or formed in any desired manner.

Carried by the outer ends of the plungers 17, parallel to the wheel axis, are bearing elements through which engagement is effected between the ends of the plungers and the flange members 25, the latter being formed with slots 30 in which these bearing elements engage.

As here shown these bearing elements comprise pins 32 inserted through sleeves such as 33, which latter are inserted in turn through suitable apertures in the ends of the plungers 17 and which project also through the slots 30. Flange elements are provided on opposite ends of the sleeves 33 to prevent axial displacement thereof, these flange elements being in the form of washers 34 carried upon opposite ends of the pins and held in place respectively by the heads 32′ of the pin and cotter pins such as 35.

The slots 30 in the flange elements 25 are preferably in the form of a blunt V, longitudinally considered, with their apices pointing radially outwardly. By means of this arrangement the pressure of the air on the plungers 17 will act to keep the spokes centered in the slots 32, while at the same time allowing for the relative displacement of the axle and rim axes which occurs as the wheel rotates. The walls of the slots 30 will have a cam action on the sleeves 33 resisting, by compression of the spokes, the circumferential movement of the rim on the spokes.

Having thus described my invention what

I claim as new and desire to protect by Letters Patent of the United States is as follows:

In a resilient wheel structure comprising a unitary hub having radially extending cylinders open at their outer ends, said hub being open at one side, a detachable cover for said hub opening, plunger elements telescoping within said cylinders and forming therewith the spokes of said wheel, check valves for allowing air to pass into said cylinders from said hub and preventing the reverse passage of air, a rim, inwardly projecting flanges arranged in pairs and in parallel relation about the inner surface of said rim, said flanges having V-shaped slots with the apices thereof presented radially outwardly, sleeves in the outer ends of the plunger elements having their axes parallel to the axis of the wheel, pins extending through and mounted in said sleeves, the ends of said pins extending through said slots abutting against the ends of said sleeves and against said flanges, and means for maintaining said washers in place on said pins.

In testimony whereof I have affixed my signature.

MICHAL GRALENSKI.